US006492939B1

(12) United States Patent
Fredericks et al.

(10) Patent No.: US 6,492,939 B1
(45) Date of Patent: Dec. 10, 2002

(54) PHASE COHERENT OPTICALLY DELAYED RADAR TARGET

(75) Inventors: Duane G. Fredericks, 63 Woodbury Dr., Lockport, NY (US) 14094; James N. Devlin, Lakeview, NY (US)

(73) Assignee: Duane G. Fredericks, Lockport, NY (US)

( * ) Notice: Subject to any disclaimer, the term of this patent is extended or adjusted under 35 U.S.C. 154(b) by 0 days.

(21) Appl. No.: 09/982,331

(22) Filed: Oct. 18, 2001

Related U.S. Application Data
(60) Provisional application No. 60/245,313, filed on Nov. 2, 2000.

(51) Int. Cl.[7] .................................................. G01S 7/40
(52) U.S. Cl. .................... 342/172; 342/54; 342/169; 434/2; 434/4
(58) Field of Search ................................. 342/172, 187, 342/170, 171, 194, 165, 169, 15; 434/2, 4

(56) References Cited

U.S. PATENT DOCUMENTS

| 5,019,826 A | * | 5/1991 | de La Chapelle et al. .. 342/202 |
| 5,164,734 A | * | 11/1992 | Fredericks et al. .......... 342/172 |
| 5,351,054 A | * | 9/1994 | Fredericks et al. .......... 342/172 |
| 5,493,304 A | * | 2/1996 | Lee et al. .................... 342/360 |
| 5,726,657 A | * | 3/1998 | Pergande et al. ............ 342/202 |

OTHER PUBLICATIONS

"A test target generator for wideband pulsed Doppler radars", Phoung Phu; Adler E.; Innocenti, R.; Paolella, A. Microwave Systems Conference, 1995. Conference Proceedings., IEEE NTC '95 , 1995, pp.: 109–111.*

"Flyable fiber–optic radar target generator", Prcic, M.M., IEEE Aerospace and Electronics Systems Magazine , vol.: 9 Issue 1 , Jan. 1994, pp.: 17–20.*

"Fiber optic dual delay line for a multi–mode radar test target simulator", Paolella, A.; Malone, S.; Higgins, T.; Scheiner, B.; Adle E., Microwave Symposium Digest, 1993., IEEE MTT–S International , 1993, pp.: 1059–1062 vol.2.*

"Long microwave delay fiber–optic link for radar testing", Newberg, I.L.; Gee, C.M.; Thurmond, G.D.; Yen, H.W., Microwave Theory and Techniques, IEEE Transactions on , vol.: 38 Issue: 5 , May 1990, pp.: 664–666.*

* cited by examiner

Primary Examiner—John B. Sotomayor
(74) Attorney, Agent, or Firm—Greenwald & Basch LLP; Howard J. Greenwald

(57) ABSTRACT

A radar target with delayed reply means. The radar target contains devices for: (a) receiving a radar signal which has a frequency of from about 0.5 to about 94 gigahertz, (b) phase coherently amplitude modulating a continuous wave light emission with the radar signal with the frequency of from about 1 to about 94 gigahertz, (c) delaying an amplitude modulated light pulse for at least about one radar pulse width, (d) detecting the delayed modulated amplitude modulated light pulse, (e) converting a detected amplitude modulated light pulse into a converted radio frequency pulse, (f) modulating the converted radio frequency pulse, thereby producing a delayed modulated radio frequency pulse, and (g) transmitting the delayed modulated radio frequency pulse.

18 Claims, 2 Drawing Sheets

PHASE COHERENT OPTICALLY DELAYED RADAR TARGET

CROSS-REFERENCE TO RELATED PATENT APPLICATION

Priority for this patent application is based upon applicant's provisional patent application No. 60/245,313, filed on Nov. 2, 2000.

BACKGROUND OF THE INVENTION

U.S. Pat. No. 5,164,734 of Duane G. Fredericks et al. disclosed and claimed an apparatus for producing an electromagnetic signal which contained: (a) means for receiving a radar signal which has frequency of from about 10 to about 94 gigacycles, (b) means for decreasing the frequency of said radar signal by at least about 65 percent, thereby producing a reduced frequency electromagnetic signal with a center frequency of from about 700 to about 1,300 megacycles; (c) delay means for delaying said reduced frequency electromagnetic signal by at least about three radar pulse widths and from about 5 to about 100 microseconds, thereby producing a delayed electromagnetic signal wherein the delay means is comprised of a first delay circuit and a second delay circuit, each of which is substantially non-attenuating and non-dispersive, (d) means for increasing the frequency of said delayed electromagnetic signal to produce a delayed electromagnetic wave with an increased frequency which is substantially identical to the frequency of said radar signal, thereby producing a delayed radar signal of from about 1 to about 94 gigagcycles; (e) means for modulating said delayed radar signal with a frequency of from about 1 to about 94 gigacycles, thereby producing a modulated, delayed radar signal; and (f) means for transmitting said modulated, delayed radar signal. The entire disclosure of this United States patent is hereby incorporated by reference into this specification.

However, the device claimed in U.S. Pat. No. 5,164,732 was operable only over a relatively narrow bandwidth and, because it utilized down conversion, produced spurious emissions. It is an object of this invention to produce a radar target with delayed reply means that overcomes these limitations.

SUMMARY OF THE INVENTION

In accordance with this invention, there is provided a radar target with delayed reply means. The radar target comprises: (a) means for receiving a radar signal which has a frequency of from about 0.5 to about 94 gigahertz; (b) means for phase coherently amplitude modulating a continuous wave light emission with said radar signal with said frequency of from about 1 to about 94 gigahertz, thereby producing an phase coherent amplitude modulated light pulse; (c) fiber optic delay means for delaying said amplitude modulated light pulse for at least about one radar pulse width, thereby producing a delayed amplitude modulated light pulse; (d) means for detecting said delayed modulated amplitude modulated light pulse, thereby producing a detected amplitude modulated light pulse; (e) means for converting said detected amplitude modulated light pulse into a converted radio frequency pulse; (f) means for modulating said converted radio frequency pulse, thereby producing a delayed modulated radio frequency pulse, and (g) means for transmitting said delayed modulated radio frequency pulse.

BRIEF DESCRIPTION OF THE DRAWINGS

The invention will be described by reference to the following drawings, in which like numerals refer to like elements, and in which.

DESCRIPTION OF THE PREFERRED EMBODIMENTS

Figure 2:
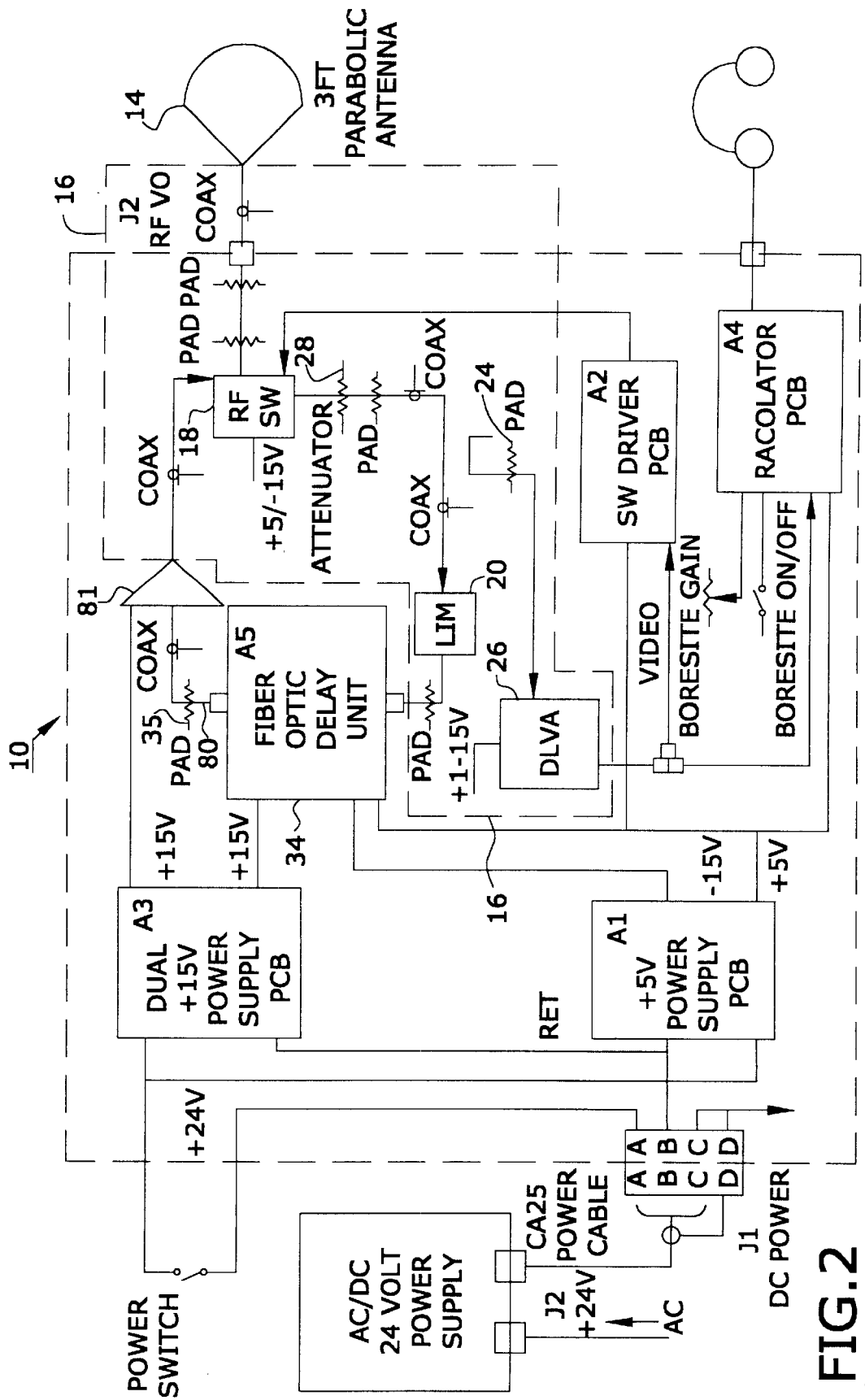
FIG. 2 is a block diagram of one preferred device of this invention.

FIG. 2 is a diagram of one preferred device 10 of applicant's invention. In the first step of the process, a radio frequency signal with a frequency of from about 0.5 to about 94 gigahertz is received by receiver 12 equipped with microwave antenna 14. One may use any of the microwave antennas known to those skilled in the art. Reference may be had, e.g., to U.S. Pat. Nos. 6,268,774, 6,254,601, 6,253,871, 6,252,558, 6,252,556, and the like. The entire disclosure of this United States patent is hereby incorporated by reference into this specification.

In one embodiment, microwave antenna 14 is a three-foot parabolic antenna with a gain of about 31 decibels. In another embodiment, microwave antenna 14 is a microwave horn antenna with a gain of from about 5 to about 15 decibels.

One may use any of the receivers known to those skilled in the art for receiving radio frequency energy over the range of from about 0.5 to about 94 gigahertz. Thus, by way of illustration and not limitation, and referring to FIG. 2, one may utilize the receiver 12 depicted by dotted line 16. This receiver 12 is comprised of radio frequency duplexer 18, radio frequency protective limiter 20, a 10 decibel radio frequency pad 22, directional coupler and pad 24, a detected log video amplifier 26, variable radio frequency attenuator 28, and various other radio frequency components. As will be apparent to those skilled in the art, the receiver depicted in FIG. 2 receiving the radar signals without substantially changing any property of the signals.

Referring again to FIG. 1, the signal which is received in receiver 12 is fed via line 30 to a preamplifier 32. This preamplifier anticipates a certain amount of attenuation which will occur in the rest of the circuitry, including the fiber optical portions thereof, and compensates for the anticipated losses. Referring to FIG. 2, the preamplifier 32 is incorporated into the fiber optic delay unit 34.

Referring again to FIG. 1, the amplified signal from preamplifier 32 is passed via line 34 to isolator 36. The function of isolator 36 is to maximize power transfer to the external mach-Zender modulator 38 by adjusting the impedance of the signals. In the embodiment depicted in FIG. 2, the isolator 36 is incorporated into the fiber optic delay unit 34.

One may use many of the isolators known to those skilled in the art as isolator 36. Thus, e.g., one may use ferrite isolators. Reference may be had, e.g., to U.S. Pat. Nos. 6,100,841, 6,011,449, 5,886,534, 5,882,310, 5,760,667, and the like. The entire disclosure of each of these United States patents is hereby incorporated by reference into this specification.

The signal from isolator 36 is fed via line 37 to electro-optic modulator 38 which, in the preferred embodiment depicted, is an external Mach-Zender modulator. These modulators are well known to those skilled in the art. Reference may be had, e.g., to U.S. Pat. Nos. 6,259,544, 6,246,498, 6,222,658, 6,181,450, 6,163,394, 6,151,438, 6,141,086, 6,046,838, and the like. The entire disclosure of each of these United States patents is hereby incorporated by reference into this specification.

As is disclosed in the aforementioned U.S. Pat. No. 6,046,838, optical fiber has an inherent bandwidth which is much greater than metal-based conductors, such as twisted pair or coaxial cable.

A typical optical communications system includes a transmitter, an optical channel (e.g., optical fiber), and a receiver. Within the transmitter, an electro-optic modulator is often used to modulate an optical carrier with the information to be transmitted. The modulated carrier is transmitted across the optical channel to the receiver, which receives/retrieves the information from the carrier.

A common electro-optic modulator used in such systems is the Mach-Zender modulator (MZM), which operates on the principle of phase interferometry. The MZM, however, is an inherently non-linear device while many communications systems would benefit from linear operation. As a result, the MZM is often operated in a mode which minimizes the non-linear effects of its transfer function, such as second and higher order harmonics, by applying a bias signal to the MZM to establish an operating point, or bias point, in the most linear region of the MZM's transfer function and then operating the MZM over a limited range about this bias point. The bias point, however, may vary due to temperature variations, signal fluctuations, manufacturing tolerances, aging, and other factors. In fact, since the MZM is based on phase interferometry, small changes in the environment or operation of the MZM may lead to significant changes in optical path lengths within the MZM which, in turn, will cause the bias point to drift significantly. If the proper bias point is not maintained, the MZM will exhibit stronger non-linearity, including the generation of even-order harmonics and the reduction of the signal strength. This, in turn, will decrease the maximum dynamic range of the optical communications link and will otherwise degrade the performance of the overall system. Therefore, it is important to control the bias signal applied to the modulator to ensure operation at the correct bias point.

In one approach, amplitude modulation is applied to the information signal being transmitted by the modulator. As a result, the optical output of the modulator is also amplitude modulated. This amplitude modulation at the output is detected and used to control the bias point. Amplitude modulation, however, introduces upper and lower sidebands. Since the information signal typically has a broad bandwidth, these upper and lower sidebands can also be quite wide. As a result, the amplitude modulation approach results in distortion of the information signal. An envelope detector is also required to detect the amplitude-modulated component.

Furthermore, many of these approaches rely on non-coherent detection techniques. For example, an approach based on the sum component typically relies on detecting only the amplitude, and not the phase, of the resulting sum component. The amplitude modulation approach typically relies on an envelope detector which also loses any phase information. Hence, in both approaches, control of the bias point can only be based on the amplitude and not the phase of the feedback signal, thus limiting the types and effectiveness of suitable control algorithms.

Referring again to FIGS. 1 and 2, and in the preferred embodiment depicted therein, applicants solution to these problems is presented. Laser 50 provides light via line 52 to electrooptic modulator 38. The light produced by laser 50 is a continuous wave light emission. Reference may be had, e.g., to U.S. Pat. Nos. 4,853,534, 6,143,138, 6,121,984, 6,002,452, 5,844,588, 5,808,200, 5,774,196, and the like. The entire disclosure of each of these United States patents is hereby incorporated by reference into this specification.

It is preferred that the light so provided be stabilized light from a stabilized light source. As used herein, the term stabilized light refers to amplitude stabilized light in which the amplitude of the light is substantially constant and does not vary by more than about 2 percent. Reference may be had, e.g., to U.S. Pat. Nos. 6,134,011, 5,953,122, 5,898,181, 5,777,737, 5,726,455, 5,694,114, 5,519,530, 5,485,274, 5,350,913, 5,311,592, 5,218,426, 5,063,568, 4,927,266, 4,856,899, 4,492,859, 4,271,123, and the like. The entire disclosure of each of these United States patents is hereby incorporated by reference into this specification.

The stabilized light preferably has a power stability of about 0.1 percent over a period of one hour at a constant temperature. Such stabilized light is produced, e.g., by high performance diode laser assemblies that include thermal electric cooling device 54 for temperature stability. See, for example, pages 45.8 to 45.9 of the Melles Griot catalog which describe, e.g., "LAZERGUIDE" Industrial Alignment Diode Laser Assemblies.

Figure 1:
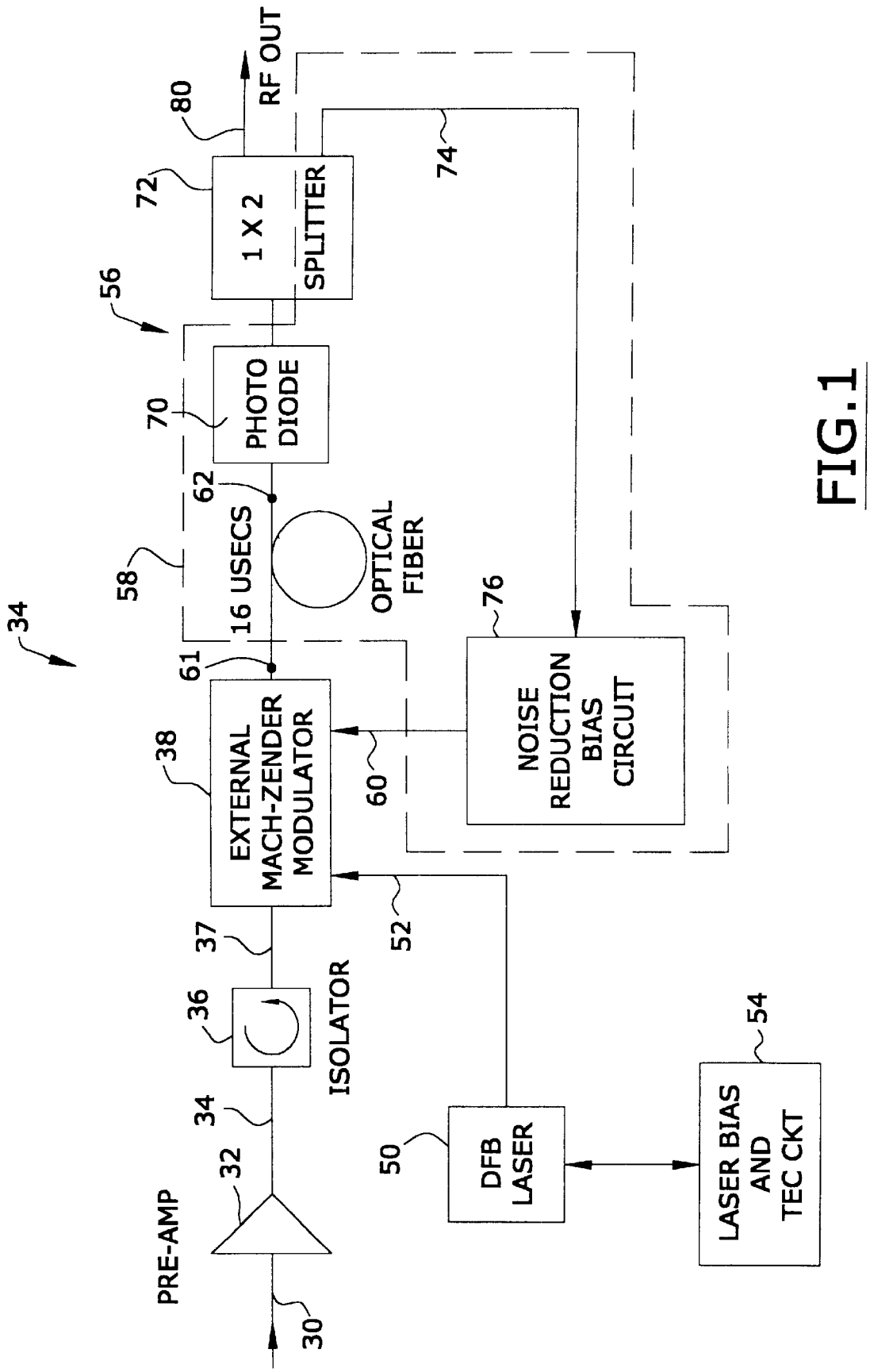
FIG. 1 is a block diagram of one preferred optical delay device.

In the preferred embodiment depicted in FIG. 1, a thermal electric cooling device 54 is used to regulate the temperature of the laser 50 and to insure that its light output has substantially constant output. In one embodiment, the cooling device 54 operates on the well-known Peltier effect via thermoelectric cooling. As is known to those skilled in the art, thermoelectric cooling is a refrigeration method. When an electric current passes through a thermocouple of two dissimilar metals joined in two places, heat is absorbed at the cold junction and dissipated at the hot junction. The cold junction can be mounted in a chamber to be cooled.

Referring again to FIG. 1, degenerative feedback from the delay circuit 56 (defined by dotted line 58) is fed back to the modulator 38 by means of line 60. Referring to FIG. 2, the feedback circuit 56 is preferably incorporated within delay unit 34.

In the modulator 38, with its associated circuitry, means are provided for phase coherently amplitude modulating a continuous wave light with said radar signal with said frequency of from about 1 to about 94 gigahertz, thereby producing a phase coherent amplitude modulated light pulse.

The modulation which occurs in modulator 38 is phase coherent, i.e., the optical pulse produced by the modulator 38 has substantially the same characteristics as the radio frequency input pulse fed to the modulator via line 37. Phase coherent amplitude modulation is well known. Reference may be had, e.g., to U.S. Pat. Nos. 5,920,551, 5,301,167, 4,694,257, 4,475,247, 4,163,233, and the like. Reference also may be had to U.S. Pat. Nos. 6,029,116, 6,016,990, 5,999,561, 5,928,152, 5,726,657, 5,619,212, 5,529,068, 5,428,361, 5,347,283, 5,159,406, 5,019,826, and the like. The entire disclosure of these United Staes patent is hereby incorporated by reference into this specification.

Referring again to FIG. 1, and in the preferred embodiment depicted therein, there are also provided fiber optic delay means for delaying said amplitude modulated light pulse for at least about one radar pulse width, thereby producing a delayed amplitude modulated light pulse. Thus, e.g., one may use fiber optic delay unit 34 (see FIG. 2) for this purpose. In one embodiment, the delay is greater than one radar pulse width.

One may purchase fiber optic delay units which provide the desired functionality. Thus, by way of illustration and not limitation, assembly 34 may be purchased as an optical delay assembly with a 16 microsecond delay which is sold by the Custom Microelectronic Systems, Inc. of 2903 Robinwood Lane, Northport, Ala., as part number L1516us. Alternatively, one may purchase fiber optic delay unit FW/CMSDL15116us from Fredwal Inc. of Lockport, N.Y. Alternatively, one may use any of the fiber optical delay assemblies known to those skilled in the art. Reference may be had, e.g., to U.S. Pat. Nos. 6,269,198, 6,255,992, 6,249, 622, 6,225,619, 6,101,454, 6,084,233, 6,040,571, 6,028,300, and the like. The entire disclosure of each of these United States patents is hereby incorporated by reference into this specification.

In general, the delay effected by fiber optic delay unit 34 (see FIG. 2) does not change the phase of the signal delayed. Referring to FIG. 1, the light pulse exiting modulator 38 at point 61 has a phase which is substantially identical to the phase of the delayed pulse appearing at point 62. As will be apparent to those skilled in the art, because the delay is not affected by means of inductances and/or capacitances, there is substantially no phase change, the phase being within about 5 degrees of the original.

Referring again to FIG. 1, device 34 is comprised of means for detecting the delayed modulated amplitude modulated light pulse, thereby producing a detected amplitude modulated light pulse. In the embodiment depicted, this function is performed by photodiode 70 (see FIG. 1), and/or by other suitable photodiode detectors. Reference may be had, e.g., to U.S. Pat. Nos. 6,298,914, 6,267,913, 6,267,722, 6,266,142, 6,262,407, 6,259,545, 6,255,118, 6,252,689, 6,251,679, 6,248,078, and the like. The entire disclosure of each of these United States patents is hereby incorporated by reference into this specification.

As will be apparent, and referring again to FIG. 1, the output of photo diode 70 is a series of electrical signals corresponding to the input light pulses, and correlating to the envelope of the input radio frequency pulses. Each train of light pulses is a component of a radio frequency output envelope that corresponds to the radio frequency input envelope to antenna 14 (see FIG. 2).

The radio frequency pulses fed from photodiode 70 are fed to a splitter 72 which, by feeding back a portion of the input via line 74 to noise reduction bias circuit 76, reduces the noise in the modulator 38. Another portion of the input to splitter 72 is fed out via line 80 to pad 35 and then to amplifier 81 (see FIG. 2).

The device 10 of this invention also is comprised of means for modulating said converted radio frequency pulse, thereby producing a delayed modulated radio frequency pulse. Thus, and referring to FIG. 2, and in the preferred embodiment depicted therein, the output from delay unit 34 is preferably amplified by amplifier 81 and thereafter modulated in modulator 82.

One may use any means of modulation such as, e.g., frequency modulation, pulse modulation, phase modulation, etc. Thus, e.g., one may use one or more of the means of modulation disclosed in U.S. Pat. No. 5,351,054, the entire disclosure of which is hereby incorporated by reference into this specification.

Thus, e.g., and is disclosed in U.S. Pat. No. 5,351,054, the signal may be modulated in a modulator 114, in which a Doppler velocity is added or subtracted from the carrier. Alternatively the signal may be modified in a device in which the incoming pulse repetition frequency is generally divided by 2 and the carrier is bi-phase modulated by a 180 degrees on alternate received PRF pulses.

In another embodiment, discussed in U.S. Pat. No. 5,351, 054, in a specified modulator 106, certain frequency characteristics of the signal wave are varied or selected. Thus, by way of illustration, modulator 106 may be a Serrodyne Doppler frequency modulator, and the like. These Serrodyne modulators are well known to those skilled in the art. Reference may be had, e.g., to U.S. Pat. Nos. 4,654,608, 6,060,917, 5,880,689, 5,878,335, 5,384,637, 5,303,412, and the like. The entire disclosure of each of these United States Patents is hereby incorporated by reference into this specification.

In one embodiment, the target 10 of such patent may be used to calibrate pulse Doppler radar signals. As is known to those in the art, when a target is moving toward or away from a transmitter, the frequency of the returned echo is shifted from the original frequency by an amount dependent on the radial velocity of the target. The change in frequency is called the Doppler frequency. Alternatively, or additionally, the target 10 of such patent may be used as a beacon transponder.

In one embodiment, depicted in FIG. 6 of U.S. Pat. No. 5,351,054, one may use a radar Bi-phase modulator 112 which can be used as in the target device of the invention. Referring to such FIG. 6, it will be seen that modulator 112 is comprised of input connector 166, into which is fed the output from the up converter mixer 72. The signal from input connector 166 is then fed via line 168 to directional coupler 170, in which the signal is split into two directions. One portion of the signal is passed via line 172 to Bi-phase modulator 174; and the other portion of the signal is passed via line 176 to radio-frequency crystal detector 178. The detected radio-frequency signal is converted to a positive video pulse in detector 178 and then passed via line 180 to video amplifier 182. The output from video amplifier 182 is fed via line 184 to a flip/flop, divide-by-two multivibratror 186, where the PRF (pulse repetition frequency) is divided by 2. The output from the multivibrator 186 is then fed via line 188 to Bi-phase modulator 174, which controls the modulation of the radio-frequency input signal applied to the modulator via line 172, thus producing, on alternate pulses, zero phase shift or 180 degrees phase shift.

The radar Bi-phase modulator 112 is a commercially available unit which may be purchased from Fredwal Inc. of Lockport, N.Y. The modulator used in this embodiment is well known to those skilled in the art. It has been used for many years in a device identified as "Model 8701-0100-2 'X' Band Pulse Doppler Radar Target," which is sold by the Fredwal Inc. of 160 Washburn Street, Lockport, N.Y. 14094. The device is described in a publication made in April, 1991 and entitled "Operations and Maintenance Manual for Model: 8701-0100-2. . . "Tactical Radar Training System."

In one embodiment, depicted in FIG. 7 of such U.S. Pat. No. 5,315,054, there is illustrated a tactical radar training system 200 which is adapted to simulate moving objects such as, for example, low altitude threat aircraft. This system 200 provides a cost effective simulation system which is adapted to train radar operators without the need to fly aircraft against the radar system. In one embodiment of system 200, the radar is adapted to simulate aircraft ranges of from about 100 microseconds (8 miles) down to about 5 microseconds (less than 0.5 mile) beyond the target location. The range of velocities that can be developed is from about 5 knots to about 4,000 knots, or more. The signals can be modulated to emulate such simulation signals. The training system 200 may be used, for example, to simulate the approach of a single high-speed, low-altitude threat aircraft. Alternatively, training system 200 may be used to simulate the approach of several aircraft approaching simultaneously. Alternatively, the system 200 can be used to simulate a slower moving helicopter.

Referring to FIG. 7 of such U.S. Pat. No. 5,351,054, it will be seen that radar training system 200 is comprised of a high performance radar system 202 (such as, e.g., a tactical radar system), a multiplicity of the delayed radar targets 204, 206, 208, and 210, a multiplicity of antenna assemblies 13, and a remote data link 212, which allows one to select the parameters of system 200 and to alter its performance.

Data link 212 is operatively connected to targets 204, 206, 208, and 210. This data link 212 can initiate the radar targets to simulate multiple approaching threat aircraft, singly or simultaneously. Several programmed combinations of Doppler frequency and rates that the range delay will incrementally reduce are available. The range to the targets 204 and/or 206 and/or 208 and/or 210 can be incrementally changed at a rate to coincide with the Doppler frequency (velocity) imparted to the radar carrier. The amplitude of the return can be attenuated to simulate a small aircraft, or the return can be amplified to simulate a larger aircraft.

In one embodiment, discussed in U.S. Pat. No. 5,351,054, each of targets 204, 206, 208, and 210 is mounted on a high tower which is high enough to appear to the radar as an approaching low altitude helicopter or a high performance aircraft. Alternatively, the targets 204, 206, 208, and 210 may be mounted on vehicles to relocate these targets to another site for maximum training authenticity. Each of the targets 204, 206, 208, and 210, after having been actuated by the data link 212 and illuminated by the host radar 202, will approach on a radial path, i.e., the simulated aircraft (or other moving objects) will approach the host radar at a constant azimuth angle and a constant elevation angle.

In another embodiment, depicted in FIG. 8 of U.S. Pat. No. 5,351,054, there is illustrated a process for using applicants' delayed radar target 10, illustrating how the use of applicants' delayed radar return system provides a radar return which is free of clutter and skin return. Referring to FIG. 8, it will seen that, in one preferred process, the target 10 is mounted on a tall object 219, such as a tower, building, or mountain top. This is done to elevate the radar beam above the radar horizon. Host radar 214 will be adjusted so that radar beam 216 has an elevation angle 218 several degrees of elevation above the radar horizon and the beam is above the ground at the delayed range. Referring to FIG. 8 of such patent, it will be seen that beam 216 is comprised of the beam center (antenna axis) 220, azimuth beamwidth 222, and elevation beamwidth 224. Referring again to FIG. 8, it will be seen that, the radar pulse 226 received by the target 10 with a pulse width 228 is delayed by a distance 230. Delayed output 232 has a pulse width 234 which is substantially the same as pulse width 228.

In another embodiment, illustrated in FIG. 9 of U.S. Pat. No. 5,351,054, there is disclosed a system 240 for assisting an aircraft (not shown) in locating the centerline 242 of an unattended airport runway 244. System 240 is preferably comprised of a pair of Doppler radar targets 246 and 248 placed at opposite ends 250 and 252 of runway 244. Each of Doppler targets 246 and 248 is comprised of two horn antennas pointing in opposite directions along the centerline 242 of runway 244. Thus, target 246 is comprised of horn antennas 254 and 256; and target 248 is comprised of horn antennas 258 and 260. Targets 246 and 248 are located distances 262 and 264 from ends 250 and 252 of runway 244. It is preferred that horn antennas 254, 256, 258, and 260 each have a wide azimuth beamwidth and a narrower elevation beamwidth. In this embodiment, it is also preferred that these horn antennas be pointed up by approximately one-half of a beamwidth. Thus, by way of illustration, the azimuth beamwidth can be about 20 degrees and the elevation beamwidth can be about 10 degrees. The aircraft (not shown) may approach from either direction. As the aircraft approaches the area within the beamwidth, two replies would appear on its radar scope. When both replies appear lined up with the zero degree cursor, the aircraft would then be "on" the centerline. The range to the runway could be observed as the aircraft approached the runway.

In another embodiment, disclosed in U.S. Pat. No. 5,351,054, the signal is modulated to simulate a helicopter. As is known to those skilled in the art, a helicopter is one type of vertical takeoff and landing (VTOL) devices which is lifted vertically and may be moved horizontally in any direction, or kept hovering, by large, motor-driven rotary blades which are mounted horizontally. By way of illustration and not limitation, the CH-47 Chinook helicopter is a medium lift helicopter which is sold by the Boeing Vertol Company of Philadelphia, Pa.; it is described, e.g., on page II/267 of Volume II of the "International Defense Equipment Catalog (IDEC)," which was published by Jules Perel's Publishing Company, Amstelveen, NL 1180, Netherlands.

By way of further illustration, the EH-101 is a triple-turbine helicopter sold by Gruppo Agusta, Via Caldera, 21, 1–20153 Milano, Italy. It is described, e.g., on page II-268 of the aforementioned "International Defence Equipment Catalog."

Gruppo Agusta also manufactures the A109A MkII/A 109 K high cruise speed helicopter and the A-129 multimission helicopter; see pages II-269 and II-270 of said "International Defence Equipment Catalog."

By way of further illustration, Hughes Helicopters, Inc. (of Centinela and Teale Streets, Building 1, Mailing Station T137, Culver City, Calif.), manufactures the AH-64A Apache attack helicopter. Hughes also manufactures the 500E and 530F business helicopters, and the MG defender light combat helicopter; see, e.g., page II/271 of said "International Defense Equipment Catalog."

By way of further illustration, the PAH-1 twin-engined anti-tank helicopter is manufactured by Messserschmitt-Bolkow-Blohm GmbH, Helicopter and Military Aircraft Group, D-8000 Munchen 80, Germany.

Many other helicopters are known to those skilled in the art. Thus, for example, and is disclosed in Charles Messenger et al.'s "Armed Forces of the World" (Gallery Books, 112 Madison Avenue, New York, N.Y., 1982), American companies manufacture the AH-1 Huey Cobra, the UH-1, the SH-2 Seasprite, the H-3 Sea King series, the OH-6A, the HH-52, the H-53 Stallion, the Super Stallion, the CH-54 Tarhe, the OH-58 Kiowa, the H-60 Black Hawk, the Sea Hawk, and the AH-64 Apache helicopters. British and French companies manufacture the Gazelle, the Puma, the Lynx, the Scout, and the Alouette helicopters. The Bo helicopter is manufactured by a German Company.

Attack helicopters, with their ability to sense enemy tanks by electronic means, and to ascend into view of a tank just long enough to fire a missile and thereafter to descend, are an especially fearsome instrument of war. In order to combat these attack helicopters, it is important that radar systems be able to readily sense the presence and location of such helicopters and, equally important, be able to distinguish whether any particular helicopter so sensed is an enemy helicopter or a friendly helicopter.

The instant embodiment of applicants' invention is designed to simulate the radar signature of various helicopters, among other things. It can be used to verify whether any particular radar system is capable of discriminating between various types of helicopters.

As will be apparent to those skilled in the art, any of the modulated information used in EW simulators and/or described such U.S. Pat. No. 5,351,054 may be imparted to the radio frequency carrier in modulator 82. Thereafter, the modulated signal is fed to radio-frequency switch 18 and thence to antenna 14, wherein it is transmitted back to the interrogating radar (not shown).

The device depicted in FIGS. 1 and 2 is capable of being used with narrow bandwidth or wide bandwidth applications, unlike the device depicted in U.S. Pat. No. 5,351,054. Thus, this device can be used with, e.g., a bandwidth of from about 0.5 to about 94 gigahertz. In one embodiment, it is used with a bandwidth of from about 5.4 gigahertz to about 5.9 gigahertz (the C band). In another embodiment, it can be used with a bandwidth of from about 0.5 to 10 gigahertz (X band).

The device of this invention is capable of utilizing wide pulse width radar inputs, with pulse widths of from about 0.1 microseconds to up to continuous wave.

In one preferred embodiment, the device illustrated in FIG. 12 of U.S. Pat. No. 5,351,054 is modified by connecting the fiber optic delay unit 34 (see FIG. 2) between elements 40 and 42 of the device of such FIG. 12 (replacing device 522 of such FIG. 12) and, additionally, connecting the output delay of unit 34 to counter 520 via diode 538.

In another embodiment, the device 10 of this invention can be used to measure the phase coherency of a radar system. In particular, the system can be used as a beacon transponder to verify the phase coherency of the transmitted and received pulses of a radar system.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A radar target with delayed reply means, wherein said radar target comprises:
   (a) means for receiving a radar signal which has a frequency of from about 0.5 to about 94 gigahertz,
   (b) means for phase coherently amplitude modulating a continuous wave light emission with said radar signal with said frequency of from about 1 to about 94 gigahertz, thereby producing an phase coherent amplitude modulated light pulse,
   (c) fiber optic delay means for delaying said amplitude modulated light pulse for at least about one radar pulse width, thereby producing a delayed amplitude modulated light pulse,
   (d) means for detecting said delayed modulated amplitude modulated light pulse, thereby producing a detected amplitude modulated light pulse,
   (e) means for converting said detected amplitude modulated light pulse into a converted radio frequency pulse,
   (f) means for modulating said converted radio frequency pulse, thereby producing a delayed modulated radio frequency pulse, and
   (g) means for transmitting said delayed modulated radio frequency pulse.

2. The radar target as recited in claim 1, wherein said radar target is comprised of a microwave antenna.

3. The radar target as recited in claim 1, wherein said means for phase coherently amplitude modulating a continuous wave light emission is an electro-optic modulator.

4. The radar target as recited in claim 3, wherein said electro-optic modulator is an external Mach-Zender modulator.

5. The radar target as recited in claim 4, further comprising a light source.

6. The radar target as recited in claim 5, wherein said light source is a laser.

7. The radar target as recited in claim 6, wherein said laser is a diode laser.

8. The radar target as recited in claim 7, wherein said diode laser emits stabilized light.

9. The radar target as recited in claim 8, wherein said stabilized light has a power stability of about 0.1 percent over a period of one hour at a constant temperature.

10. The radar target as recited in claim 6, further comprising means for cooling said laser.

11. The radar target as recited in claim 10, wherein said means for cooling said laser are thermoelectric cooling means.

12. The radar target as recited in claim 6, wherein said fiber optic delay means delays said amplitude modulated light pulse for a period greater than one radar pulse width.

13. The radar target as recited in claim 12, wherein said fiber optic delay means produces a delayed amplitude modulated light pulse with a phase which is substantially identical to the phase of the incoming amplitude modulated light pulse.

14. The radar target as recited in claim 6, wherein said means for detecting said delayed amplitude modulated light pulse is comprised of a photodiode.

15. The radar target as recited in claim 14, wherein the output of said photodiode is connected to a splitter.

16. The radar target as recited in claim 6, further comprising an amplifier.

17. The radar target as recited in claim 1, wherein said means for modulating said converted radio frequency pulse is a Doppler frequency modulator.

18. The radar target as recited in claim 1, wherein said means for modulating said converted radio frequency pulse is a Serrodyne modulator.

* * * * *